United States Patent Office 3,409,661
Patented Nov. 5, 1968

3,409,661
NUCLEAR POLYSUBSTITUTED [(2-NITRO-1-ALKENYL)-ARYLOXY]ALKANOIC ACIDS
Everett M. Schultz, Ambler, and Edward J. Cragoe, Jr., Landsdale, Pa., assignors to Merck & Co., Inc., Rahway, N.J., a corporation of New Jersey
No Drawing. Filed Sept. 30, 1965, Ser. No. 491,818
16 Claims. (Cl. 260—471)

ABSTRACT OF THE DISCLOSURE

[(2 - nitro - 1 - alkenyl)phenoxy] alkanoic acid products which are nuclear substituted by two or more halogen or alkyl moieties or by an hydrocarbylene chain containing from three to four carbon atoms between its points of attachment to the benzene ring; and the salt, ester and amide derivatives thereof. The products are diuretic and saluretic agents useful in the treatment of hypercholesterolemia.

The products are prepared by treating a nuclear formyl substituted phenoxyalkanoic acid with a primary amine followed by the reaction of the intermediate thus formed with a nitroalkane or with an aryl substituted nitroalkane and, if desired, hydrolyzing the esterified intermediate thus formed to the desired product.

---

This invention relates to a new class of chemical compounds which can be described generally as [(2-nitro-1-alkenyl(aryloxy]alkanoic acids and to the nontoxic, pharmacologically acceptable salts, esters and amide derivatives thereof.

Also, it is an object of this invention to describe a novel method of preparation for the foregoing [(2-nitro-1-alkenyl)aryloxy]alkanoic acids, esters and amide derivatives.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, mobilize accumulated fluids in the tissues and, in general, alleviate conditions usually associated with edema.

The [(2 - nitro - 1 - alkenyl)aryloxy]alkanoic acids of the invention are compounds having the following structural formula:

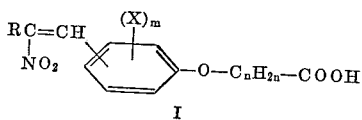

I wherein R is a member selected from the group consisting of hydrogen and alkyl, for example, lower alkyl such as methyl, ethyl, butyl, pentyl, heptyl etc.; the X radicals are similar or dissimilar members selected from the group consisting of halogen, alkyl, for example, lower alkyl and, taken together, two X radicals on adjacent carbon atoms of the benzene ring may be joined to form an hydrocarbylene chain (i.e., a divalent organic radical composed solely of carbon and hydrogen) containing from three to four carbon atoms between their points of attachment, for example, trimethylene, tetramethylene, 1,3-butadienylene (i.e., —CH=CH—CH=CH—), etc.; $m$ is an integer having a value of two to four and $n$ is an integer having a value of one to three.

A preferred embodiment of the invention relates to the [4 - (2 - nitro - 1 - alkenyl)phenoxy]alkanoic acids having the following structural formula:

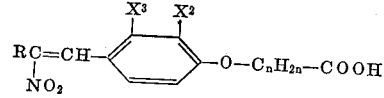

wherein R is lower alkyl; $X^2$ and $X^3$ each represent a member selected from the group consisting of halogen, lower alkyl and 1,3-butadienylene and $n$ is an integer having a value of one to three. The foregoing class of compounds exhibits particularly good diuretic and saluretic activity and represents a preferred subgroup of compounds within the scope of this invention.

The [(2 - nitro - 1 - alkenyl)aryloxy]alkanoic acids (I) of the invention are conveniently prepared by the reaction of a formyl substituted phenoxyalkanoic acid or a suitable esterified derivative thereof (II, infra), with a primary amine such as an alkylamine or an arylamine, followed by the reaction of the intermediate thus formed with a nitroalkane or an appropriate aryl substituted nitroalkane. When the formyl substituted reagent (II) is an ester of a formyl substituted phenoxyalkanoic acid the product obtained is the corresponding esterified derivative (Ia, infra) which, if desired, may be isolated as such or, alternatively may be hydrolyzed in an aqueous acidic medium to yield the corresponding acid product (I). The following equation illustrates the reaction, including the hydrolysis step; however, it is to be understood that the hydrolysis step is an optional one which is employed only when $R^2$ in the planar formulae Ia and II, infra, represents an hydrocarbyl radical and it is desired to obtain the [(2-nitro-1-alkenyl)aryloxy]alkanoic acid product (I):

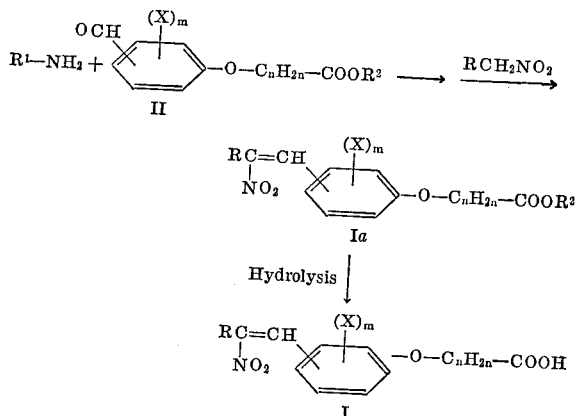

wherein R, X, $m$ and $n$ are as defined above; $R^1$ is a member selected from the group consisting of alkyl, aryl, for example, mononuclear aryl such as phenyl, p-tolyl, naphthyl, etc. and $R^2$ is a member selected from the group consisting of hydrogen and an hydrocarbyl radical, i.e., an organic radical composed solely of carbon and hydrogen such as an alkyl radical, etc.

Preferably, the condensation of the formyl substituted phenoxyalkanoic acid, or a corresponding ester derivative thereof (II), with the primary amine reagent is conducted in the presence of a water-immiscible solvent system to allow for removal of the water formed during the reaction as, for example, by azeotropic distillation or, alternatively, by the use of chemical dehydrating agents or molecular sieves. In general, any water-immiscible solvent in which the reactants and products are reasonably soluble may be employed but benzene has proved to be a particularly advantageous reaction medium for this purpose.

Equimolar quantities of the formyl substituted phenoxyalkanoic acid reactant (or of a corresponding ester derivative thereof), the primary amine and the nitroalkane reactants may be employed but it has been found that slight excesses of amine and nitroalkane may also be used with good results. Also, it is most advantageous to add a molar excess of a substantially anhydrous lower alkanoic acid, such as glacial acetic acid, to the reaction mixture containing the nitroalkane reactant. The reaction mixture may then be heated to boiling for a short period, cooled and then poured over ice water to precipitate the desired [(2-nitro-1-alkenyl)-aryloxy]alkanoic acid or the corresponding ester derivative thereof.

The hydrolysis step is advantageously conducted in an aqueous medium containing a catalytic amount of an acid such as a mineral acid, for example, hydrochloric acid, etc. Also, it is advantageous to employ a solvent in which the ester is reasonably soluble such as a lower alkanoic acid, for example, acetic acid, etc. The hydrolysis may be conducted at ambient temperatures but, generally, it is most advantageous to carry out the hydrolysis at elevated temperatures such as at 50° C. to the reflux temperature of the reaction mixture.

The formyl substituted phenoxyalkanoic acids and their corresponding ester derivatives (II) which are employed as starting materials in the aforementioned reaction with a primary amine and nitroalkane or an appropriate aryl substituted nitroalkane, may be prepared by several alternate routes. However, inasmuch as the methods for the preparation of the ester derivatives (IIc, infra) differ somewhat from the methods for the preparation of the corresponding acids (IIa, infra), the various synthetic routes for their preparation will be discussed separately.

The formyl substituted phenoxyalkanoic acid starting materials (IIa) are conveniently prepared from their corresponding nuclear hydroxy substituted benzaldehyde precursors (III, infra) by the reaction of the latter with an appropriate etherification reagent.

When, for example, it is desired to prepare a formyl substituted phenoxyalkanoic acid (IIa) wherein the alkylene chain and the alkanoic acid moiety have one or three linear carbon atoms in the chain between the carboxy and oxygen radicals, the etherification reagent is an haloalkanoic acid having the following formula:

$$X^1-Y^1-COOH$$

wherein $X^1$ is halogen, for example, chlorine, bromine, iodine, etc. and $Y^1$ is methylene, trimethylene, ethylidene, etc. In general, the etherification is conducted in the presence of a base such as an aqueous solution of sodium or potassium carbonate or in the presence of the corresponding hydroxide or in the presence of a sodium alcoholate such as sodium ethoxide, and the alkanoic acid salt thus obtained is then converted to the desired formyl substituted phenoxyalkanoic acid derivative (IIa) in the conventional manner by treatment with an acid such as hydrochloric acid. The following equation illustrates the reaction:

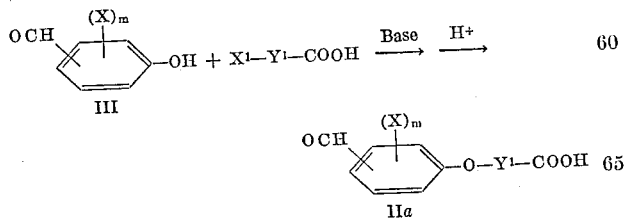

wherein $X$, $X^1$, $Y^1$ and $m$ are defined above and $H^+$ is the cation derived from an organic or inorganic acid such as hydrochloric acid, etc. The choice of a suitable reaction solvent for the process is dependent largely upon the character of the reactants employed; however, in general, it can be stated that any solvent which is substantially inert with respect to the reactants and in which the reagents are reasonably soluble, may be used. Solvents which have proved to be particularly advantageous include ethanol and dimethylformamide. Also the reaction may be carried out at ambient temperature but, generally, it is most desirable to conduct the reaction at temperatures slightly above ambient temperature.

Those formyl substituted phenoxyalkanoic acids starting materials (IIb, infra) wherein the alkylene chain contains two linear carbon atoms between the carboxy and oxygen moieties are prepared from their corresponding nuclear hydroxy substituted benzaldehyde precursors (III) by the reaction of the latter with propiolactone or with an appropriately substituted propiolactone, in the presence of a base such as an aqueous solution of sodium hydroxide, preferably, while heating the solution at reflux temperatures; followed by the acidification of the carboxylate intermediate thus formed to the corresponding formyl substituted phenoxyalkanoic acid (IIb). The following equation illustrates the reaction:

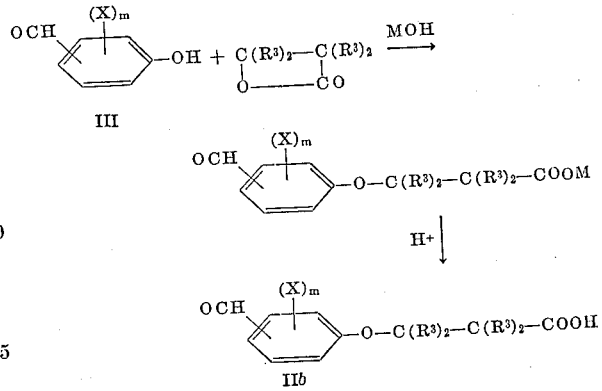

wherein $X$, $m$ and $H^+$ are as defined above; $R^3$ is a member selected from the group consisting of hydrogen and lower alkyl, for example, methyl and M is the cation derived from an alkali metal hydroxide or an alkali metal carbonate, etc. such as a sodium or potassium cation.

The formyl substituted phenoxyalkanoic acids (IIa) can also be prepared by the hydrolysis, in an aqueous solution of an acid or a base, of the corresponding formyl substituted phenoxyalkanoic acid ester (IIc, infra) as shown by the following equation:

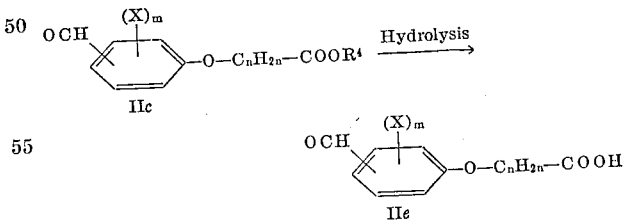

wherein $X$, $m$ and $n$ are as defined above and $R^4$ is an hydrocarbyl radical, for example, alkyl, etc.

The formyl substituted phenoxyalkanoic acid esters (IIc) which are also employed as starting materials in the preparation of the [(2-nitro-1-alkenyl)aryloxy] alkanoic acid products (I) of the invention may also be prepared by either of three alternate routes: (a) by the etherification of an appropriate nuclear hydroxy substituted benzaldehyde (III); (b) by the esterification of a formyl substituted phenoxyalkanoic acid (IIb); or (c) by the formylation of a phenoxyalkanoic acid ester (V, infra).

The etherification process (a) for the preparation of the formyl substituted phenoxyalkanoic acid esters is conducted in a manner similar to that described above for the preparation of the corresponding formyl substituted phenoxyalkanoic acids (IIa). An haloalkanoic acid ester in which the alkylene chain joining the halogen and carboxyl groups is a methylene or trimethylene moiety or an homologous alkyl substituted derivative thereof such as an ethylidene radical, is treated with a nuclear hydroxy substituted benzaldehyde (III) in the presence of a base such as sodium or potassium carbonate or sodium or potassium hydroxide or in the presence of a sodium alcoholate such as sodium ethoxide and, preferably, at temperatures above ambient temperature. The choice of a suitable reaction solvent is dependent largely upon the character of the reactants employed but, in general, any solvent which is substantially inert to the reactants and in which the reagents are reasonably soluble may be used. Ethanol and dimethylformamide have proved to be particularly advantageous solvents in which to conduct the synthesis. The following equation illustrates the reaction:

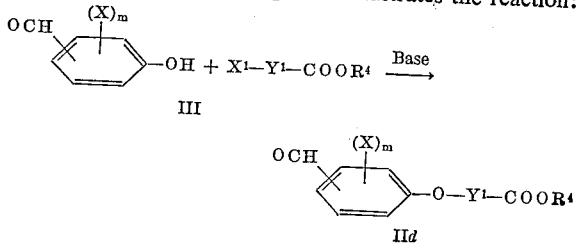

III

IId wherein $R^4$, X, $X^1$, $Y^1$ and m are defined above. Suitable reaction solvents may be employed but ethanol or dimethylformamide has proved to be a particularly advantageous reaction medium. Also, the reaction may be conducted at ambient temperatures but, generally, it is desirable to conduct the reaction at temperatures above ambient temperature. Also, it will be appreciated that in view of the limitation on the length of the alkylene chain (i.e., the linkage $Y^1$) in the haloalkanoic acid ester reactant, the foregoing etherification reaction is limited to the preparation of formyl substituted aryloxyacetic and butyric acid esters, including the branched chain derivatives thereof such as the 2-(formyl substituted phenoxy) propionic acid esters, etc.

The esterification process (b) for the preparation of the formyl substituted phenoxyalkanoic acid esters (IIc) is effected by the reaction of an appropriate formyl substituted phenoxyalkanoic acid (IIe) with an appropriate lower alkanol, etc. in the presence of a catalyst, such as a mineral acid or boron trifluoride, to obtain the corresponding esterified product; or, alternatively, by the reaction of a formyl substituted phenoxyalkanoic acid (IIe) with a suitable reagent to form the corresponding acid halide and then treating the said formyl substituted phenoxyalkanoic acid halide (IV, infra) thus formed with the lower alkanol reagent, etc. to prepare the corresponding esterified product (IIc). The following equation illustrates those methods of preparation:

wherein $R^4$, X, m and n are as defined above.

The formylation process (c) for preparing the formyl substituted phenoxyalkanoic acid ester starting materials (IIc) is conducted by treating an appropriate phenoxyalkanoic acid ester (V, infra) with formaldehyde and concentrated hydrochloric acid to obtain the corresponding chloromethyl substituted phenoxyalkanoic acid ester (VI) and the chloromethyl derivative thus obtained is then treated with hexamethylenetetramine and concentrated hydrochloric acid under reflux to obtain the desired formyl substituted compound (IIc). The following equation illustrates the process:

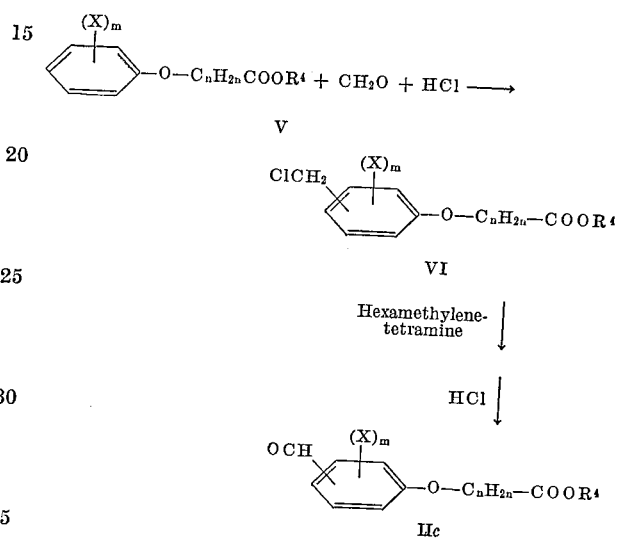

wherein $R^4$, X, m and n are as defined above.

The nuclear hydroxy substituted benzaldehyde intermediates (III) are either known compounds or may be prepared by methods which are known to those skilled in the art. Thus, for example, by treating a phenol or appropriate nuclear substituted derivative thereof with chloroform in the presence of an aqueous solution of a base and then treating the resulting mixture with an acid such as hydrochloric acid, the corresponding nuclear hydroxy substituted benzaldehyde is obtained. Alternatively, the said hydroxy substituted benzaldehyde intermediates may also be obtained by the reaction of a phenol, or appropriate nuclear substituted derivative thereof, with hydrogen cyanide and hydrogen chloride(gas) in the presence of anhydrous aluminum chloride. This reaction is preferably conducted in an inert solvent as, for example, in a benzene solution. The following equation illustrates these methods of preparation:

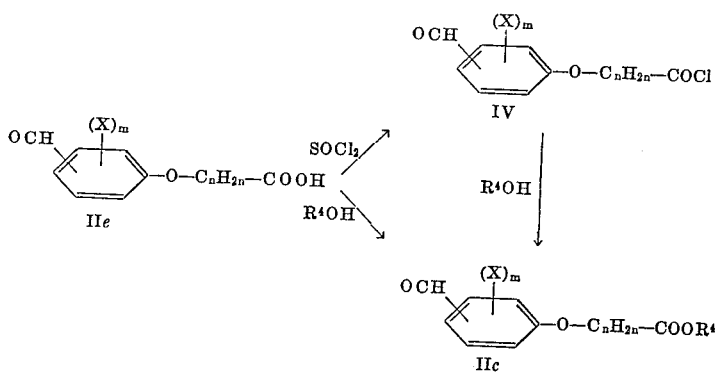

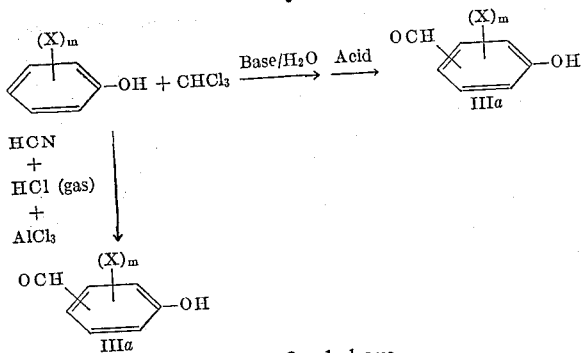

wherein X and *m* are as defined above.

The [(2-nitro-1-alkenyl)aryloxy]alkanoic acids and their ester derivatives are generally obtained as crystalline solids and, if desired, may be purified by recrystallization from a suitable solvent. Suitable solvents include, for example, methanol, ethanol, cyclohexane, etc. or mixtures of solvents such as a mixture of acetic acid and water or a mixture of ethanol, water and benzene, etc.

Included within the scope of this invention are the nontoxic, pharmacologically acceptable acid addition salts of the instant products (I). In general, any base which will form an acid addition salt with the [(2-nitro-1-alkenyl)aryloxyl]alkanoic acids (I) and whose pharmacological properties will not cause an adverse physiological effect when ingested by the body system is considered as being within the scope of this invention; suitable bases include, for example, the alkali metal and alkaline earth metal hydroxides, carbonates, etc., ammonia, primary, secondary and tertiary amines as monoalkylamines, dialkylamines, trialkylamines, nitrogen containing heterocyclic amines, for example, piperidine, etc.

Also included within the scope of this invention are the amide derivatives of the [(2-nitro-1-alkenyl)aryloxy]alkanoic acids (I) which may be prepared by several methods. According to one method, the amide derivatives are prepared by converting a [(2-nitro-1-alkenyl)aryloxy] alkanoic acid (I) to the corresponding acid halide in a conventional manner and treating the said acid halide with ammonia or an appropriate amine to obtain the desired amide. These and other equivalent methods for the preparation of the amide derivatives of the instant products (I) will be apparent to those having ordinary skill in the art and to the extent that the said derivatives are both nontoxic and physiologically acceptable to the body system, the said amides are the functional equivalent of the corresponding [(2-nitro-1-alkenyl)aryloxy]alkanoic acids (I).

The examples which follow illustrate the [(2-nitro-1-alkenyl)aryloxy]alkanoic acids, esters and amide derivatives of the inventioin and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

Example 1.—[2,3-dichloro-4-(2-nitro-1-propenyl) phenoxy]acetic acid

Step A: 2,3-dichloro-4-hydroxybenzaldehyde

A mixture of 2,3-dichlorophenol (81 g., 0.5 mole), calcium hydroxide (280 g., 3.78 mole), sodium carbonate (320 g., 3.02 mole) and water (2 liters) is placed in a 5 liter round flask equipped with a stirrer, thermometer, reflux condenser and a dropping funnel. The mixture is warmed to 62° C. (internal temperature), the heat is removed and chloroform (719 g., 1.0 mole) is added dropwise over a period of one hour. The temperature remains at about 65° C. during the addition due to heat of reaction. The mixture is heated at 90° C. for one hour and then acidified by addition of concentrated hydrochloric acid (1300 ml.) while keeping the temperature at 70° C. by external cooling.

Upon cooling to about 20° C. a brown, gummy solid separates; then water is decanted and the residue extracted with hot toluene (500 ml.). The residual water is separated from the toluene solution which then is filtered and concentrated to 150 ml. On cooling, 17.5 g. of crude 2,3-dichloro-4-hydroxybenzaldehyde, M.P. 176–180° C., separates. The product is crystallized from toluene (150 ml.) to obtain 15.6 g. of purified 2,3-dichloro-4-hydroxybenzaldehyde, M.P. 181–183.5° C.

Analysis for $C_7H_4Cl_2O_2$: Calculated, C, 44.01; H, 2.11; Cl, 37.12. Found, C, 44.22; H, 2.30; Cl, 37.02.

Step B: Ethyl (2,3-dichloro-4-formylphenoxy)acetate

A mixture of 2,3-dichloro-4-hydroxybenzaldehyde (32.9 g., 0.172 mole), anhydrous potassium carbonate (38.9 g., 0.39 mole), ethyl bromoacetate (66 g., 0.39 mole) and dimethylformamide (100 ml.) is stirred and heated at 55–60° C. for one hour. Upon adding water (300 ml.) a solid separates. The solid is dried and crystallized from cyclohexane (400 ml.) to obtain 42.0 g. (84%) of ethyl (2,3-dichloro-4-formylphenoxy)acetate, M.P. 91–92° C.

Analysis for $C_{11}H_{10}Cl_2O_4$: Calculated, C, 47.68; H, 3.64; Cl, 25.59. Found, C, 47.67; H, 3.58; Cl, 25.40.

Step C: Ethyl [2,3-dichloro-4-(2-nitro-1-propenyl) phenoxy]acetate

Ethyl (2,3-dichloro-4-formylphenoxy)acetate (4.88 g., 0.0175 mole) and n-butylamine (0.985 g., 0.0135 mole) are dissolved in dry benzene (25 ml.) and the mixture is heated under a constant water separator until no more water separates. The benzene is evaporated and to the residue is added nitroethane (3.73 g.) and acetic acid (10.4 ml.). The mixture is heated to boiling, cooled and added to ice water. The solid that separates is crystallized from a mixture of 30 parts ethanol and two parts water to obtain 3.36 g. of ethyl [2,3-dichloro-4-(2-nitro-1-propenyl)phenoxy]acetate, M.P. 88–88.5° C.

Analysis for $C_{13}H_{13}Cl_2NO_5$: Calculated, C, 46.73; H, 3.92. Found, C, 46.99; H, 3.80.

Step D: [2,3-dichloro-4-(2-nitro-1-propenyl)phenoxy] acetic acid

Ethyl [2,3-dichloro-4-(2-nitro-1-propenyl)phenoxy] acetate (3 g., 0.009 mole) is dissolved in hot acetic acid (16 ml.) and water (12 ml.) and concentrated hydrochloric acid (0.5 ml.) is added. The mixture then is heated and stirred at the boiling point for one hour. On cooling a solid separates. The product is washed with water and crystallized from a mixture of 15 parts acetic acid and 10 parts water to obtain 2 g. of [2,3-dichloro-4-(2-nitro-1-propenyl)phenoxy]acetic acid, M.P. 171–173° C.

Analysis for $C_{11}H_{19}Cl_2NO_5$: Calculated, C, 43.16; H, 2.96; N, 4.58. Found, C, 43.11; H, 3.04; N, 4.45.

Example 2.—[2,3-dichloro-4-(2-nitro-1-butenyl)phenoxy] acetic acid

Step A: Ethyl [2,3-dichloro-4-(2-nitro-1-butenyl) phenoxy]acetate

By following the procedure of Example 1, Step C, but substituting an equimolar amount of 1-nitropropane for the nitroethane recited therein, there is obtained ethyl [2,3-dichloro-4-(2-nitro-1-butenyl)phenoxy]acetate. Upon recrystallization from a mixture of eight parts acetic acid and one part water the ethyl [2,3-dichloro-4-(2-nitro-1-butenyl)phenoxy]acetate melts at 109–113° C.

Step B: [2,3-dichloro-4-(2-nitro-1-butenyl)phenoxy] acetic acid

Ethyl [2,3-dichloro-4-(2-nitro-1-butenyl)phenoxy]acetate (4.41 g.) is added to a mixture of acetic acid (20 ml.), water (14 ml.) and concentrated hydrochloric acid (¾ ml.) and the mixture heated to boiling. Hot water then is added to initiate precipitation and the solution is allowed to cool. The solid that separates is crystallized from four parts acetic acid and 3½ parts water to obtain 2.06 g. of [2,3 - dichloro-4-(2-nitro-1-butenyl)phenoxy] acetic acid, M.P. 135.5–136.5° C.

Analysis for $C_{12}H_{11}Cl_2NO_5$: Calculated, C, 45.02; H, 3.46; N, 4.38. Found, C, 45.22; H, 3.57; N, 4.21.

Example 3.—[4-(2-nitro-1-butenyl)-1-naphthyloxy]acetic acid

Step A: Ethyl (4-formyl-1-naphthyloxy)acetate

A mixture of 4-formylnaphthol (13.0 g., 0.0755 mole), potassium carbonate (15.0 g., 0.151 mole), ethyl bromoacetate (25 g., 0.151 mole) and dimethylformamide (75 ml.) is heated at 55–60° C. for one hour. The mixture then is worked up as in Example 1, Step B, to obtain 13.2 g. of ethyl (4-formyl-1-naphthyloxy)acetate, M.P. 99–100° C. from alcohol. For analysis, one gram of ethyl (4-formyl-1-naphthyloxy)acetate, crystallized two additional times from alcohol, yields a sample of product having a melting point of 100–101.5° C.

Analysis for $C_{15}H_{14}O_4$: Calculated, C, 69.75; H, 5.46. Found, C, 69.18; H, 5.58.

Step B: Ethyl [4-(2-nitro-1-butenyl)naphthyloxy]acetate

By substituting equimolar amounts of ethyl (4-formyl-1-naphthyloxy)acetate and 1-nitropropane for the ethyl (2,3-dichloro-4-formylphenoxy)acetate and nitroethane recited in Example 1, Step C, and following substantially the procedure described therein the compound ethyl [4-(2-nitro-1-butenyl)-1-naphthyloxy]acetate is obtained. Upon recrystallization from ethanol the ethyl [4-(2-nitro-1-butenyl)-1-naphthyloxy]acetate melts at 117–118° C.

Analysis for $C_{18}H_{19}NO_5$: Calculated, C, 65.65; H, 5.82. Found, C, 65.85; H, 5.89.

Step C: [4-(2-nitro-1-butenyl)-1-naphthyloxy]acetic acid

By substituting ethyl [4-(2-nitro-1-butenyl)-1-naphthyloxy]acetate (4.3 g.) for the ethyl [2,3-dichloro-4-(2-nitro-1-propenyl)phenoxy]acetate of Example 1, Step D, and following substantially the procedure described therein, the product [4-(2-nitro-1-butenyl)-1-naphthyloxy]acetic acid is obtained. Upon recrystallization from acetic acid the yield of [4-(2-nitro-1-butenyl)-1-naphthyloxy]acetic acid is 2.8 g. and the melting point is 182–183° C.

Analysis for $C_{16}H_{15}NO_5$: Calculated: C, 63.78; H, 5.02; N, 4.65. Found, C, 63.98; H, 5.31; N, 4.64.

Example 4.—[2,3-dimethyl-4-(2-nitro-1-propenyl) phenoxy]acetic acid

Step A: Ethyl (2,3-dimethylphenoxy)acetate

A 500 ml. round-bottom flask is charged with 2,3-dimethylphenol (78 g., 0.64 mole), dimethylformamide (450 ml.), anhydrous potassium carbonate (195 g., 1.4 mole) and ethyl bromoacetate (225 g., 1.34 mole). The stirred reaction mixture is heated at 60–65° C. in a water bath for 45 minutes and then poured into 1.5 liters of ice water. The product is extracted with ether (500 ml.), washed with three 500 ml. portions of water and dried over magnesium sulfate. The ether is distilled at reduced pressure and the product fractionated to give 86 g. (65%) of ethyl (2,3-dimethylphenoxy)acetate, B.P. 153–155° C./ 15 mm. The product is used in the next step without further purification.

Step B: Ethyl [2,3-dimethyl-4-(chloromethyl)phenoxy] acetate

A 250 ml. round-bottom flask fitted with a stirrer, condenser and gas inlet tube is charged with ethyl (2,3-dimethylphenoxy)acetate (21 g., 0.1 mole), benzene (40 ml.), concentrated hydrochloric acid (25 ml.) and formaldehyde (18 ml. of a 37% aqueous solution). The vigorously stirred solution is cooled to −8° C. in an ice-salt bath and treated with hydrogen chloride for 1.5 hours. The reaction mixture is stirred at room temperature for two hours and then the benzene layer is separated, washed with water and dried over magnesium sulfate. The benzene is distilled at reduced pressure and the product is recrystallized from petroleum ether to give 23.5 g. (92%) of ethyl [2,3-dimethyl-4-(chloromethyl)phenoxy]acetate, M.P. 72–74° C.

Analysis for $C_{13}H_{17}ClO_3$: Calculated, C, 60.82; H, 6.67; Cl, 13,81. Found, C, 61.06; H, 6.61; Cl, 13.58.

Step C: Ethyl (2,3-dimethyl-4-formylphenoxy)acetate

A mixture of ethyl [2,3-dimethyl-4-(chloromethyl) phenoxy]acetate (14.8 g., 0.57 mole), hexamethylenetetramine (14.7 g., 0.105 mole) and 60% aqueous ethanol (75 ml.) is refluxed for four hours. Concentrated hydrochloric acid (30 ml.) then is added to the reaction mixture and after five additional minutes of reflux, the mixture is poured into ice water. The product is extracted into ether and distilled to obtain 7.5 g. (56%) of ethyl (2,3-dimethyl-4-formylphenoxy)acetate, B.P. 140–145° C./0.05 mm.

Analysis for $C_{13}H_{16}O_4$: Calculated, C, 66.08; H, 6.83. Found, C, 66.43; H, 6.99.

Step D: Ethyl [2,3-dimethyl-4-(2-nitro-1-propenyl) phenoxy]acetate

By following the procedure described in Example 1, Step C, but substituting ethyl (2,3-dimethyl-4-formylphenoxy)acetate for the ethyl (2,3-dichloro-4-formylphenoxy)acetate recited therein there is obtained ethyl [2,3-dimethyl-4-(2-nitro-1-propenyl)phenoxy]acetate.

Step E: [2,3-dimethyl-4-(2-nitro-1-propenyl)phenoxy] acetic acid

By following the procedure of Example 1, Step D, but substituting ethyl [2,3-dimethyl-4-(2-nitro-1-propenyl) phenoxy]acetate for the ethyl [2,3-dichloro-4-(2-nitro-1-propenyl)phenoxy]acetate described therein there is obtained [2,3-dimethyl-4-(2-nitro - 1 - propenyl)phenoxy] acetic acid.

Example 5.—[4-(2-nitro-1-propenyl)-1-naphthyloxy] acetic acid

Step A: Ethyl [4-(2-nitro-1-propenyl)-1-naphthyloxy] acetate

Ethyl (4-formyl-1-naphthyloxy)acetate (6.1 g., 0.0226 mole) and n-butylamine (1.65 g., 0.0226 mole) are dissolved in dry benzene (60 ml.) and the mixture is heated under a constant water separator until no more water separates. The benzene then is evaporated at reduced pressure and nitroethane (12.5 g., 0.165 mole) in glacial acetic acid (35 ml.) is added to the residual aldimine. The mixture is heated to boiling, cooled slightly and added with stirring to crushed ice. When the ice has melted the yellow solid that forms is collected by filtration, dried by suction and crystallized from ethanol to obtain 6.5 g. of ethyl [4-(2-nitro - 1 - propenyl)-1-naphthyloxy]acetate, M.P. 148–150° C.

Analysis for $C_{17}H_{17}NO_5$: Calculated, C, 64.75; H, 5.44. Found, C, 64.38; H, 5.00.

Step B: [4-(2-nitro-1-propenyl)-1-naphthyloxy]acetic acid

By substituting an equimolar amount of ethyl [4-(2-nitro-1-propenyl)-1-naphthyloxy]acetate for the ethyl [2,3-dichloro-4-(2-nitro-1-propenyl)phenoxy]acetate of Example 1, Step D, and following substantially the procedure described therein, 3.2 g. of [4-(2-nitro-1-propenyl)1-naphthyloxy]acetic acid, M.P. 190–191° C., is obtained upon recrystallization from acetic acid.

Analysis for $C_{15}H_{13}NO_5$: Calculated: C, 62.71; H, 4.56; N, 4.88. Found, C, 62.63; H, 4.45; N, 4.85.

Example 6.—2-[2,3-dichloro-4-(2-nitro-1-propenyl) phenoxy]propionic acid

Step A: Ethyl 2-(2,3-dichloro-4-formylphenoxy) propionate

A mixture of 2,3-dichloro-4-hydroxybenzaldehyde (5.0 g.), ethyl α-bromopropionate (9.2 g.) and potassium carbonate (5.2 g.) in dimethylformamide (25 ml.) is heated at 55–60° C. for 16 hours. The mixture is diluted with water and the solid that separates is crystallized from cyclohexane to obtain 4.6 g. of ethyl 2-(2,3-dichloro-4-formylphenoxy)-propionate, M.P. 67.5–68.5° C.

Analysis for $C_{12}H_{12}Cl_2O_4$: Calculated, C, 49.51; H, 4.15; Cl, 24.36. Found, C, 49.97; H, 4.57; Cl, 23.78.

Step B: 2-[2,3-dichloro-4-(2-nitro-1-propenyl)phenoxy] propionic acid

Ethyl 2 - (2,3 - dichloro-4-formylphenoxy)propionate (2.0 g.), n-butylamine (0.51 g.) and benzene are refluxed until no more water is distilled. The benzene is evaporated and nitroethane (1.9 g.) and acetic acid (6 ml.) are added to the residue. The mixture is heated to boiling, cooled and extracted with ether. The ether layer then is dried over magnesium sulfate and evaporated and the residual oil is added to acetic acid (15 ml.), water (10 ml.) and concentrated hydrochloric acid (0.5 ml.). The mixture is refluxed for one hour and then poured onto ice. The solid that separates is crystallized from a mixture of one part benzene and one part hexane to obtain a fine solid identified as 2-[2,3-dichloro-4-(2-nitro-1-propenyl)phenoxy]propionic acid which melts at 144–145° C.

Analysis for $C_{12}H_{11}Cl_2NO_5$: Calculated, C, 45.02; H, 3.46; N, 4.38; Found, C, 44.90; H, 3.59; N, 4.39.

Example 7.—[2,3-dichloro-4-(2-nitrovinyl)phenoxy] acetic acid

By following the procedure described in Example 1, Steps A–D, but substituting an equimolar amount of nitromethane for the nitroethane recited in Example 1, Step C, there is obtained [2,3-dichloro-4-(2-nitrovinyl) phenoxy]acetic acid, M.P. 205.5–206.5° C., upon recrystallization from a mixture of 15 parts acetic acid and 10 parts water.

Analysis for $C_{10}H_7Cl_2NO_5$: Calculated, C, 41.12; H, 2.42; N, 4.80. Found: C, 41.30; H, 2.71; N, 4.59.

Example 8.—2-[2,3-dichloro-4-(2-nitro-1-butenyl) phenoxy]propionic acid

By following the procedure described in Example 6, Steps A and B, but substituting an equimolar amount of 1-nitropropane for the nitroethane recited in Step B thereof, the product 2-[2,3-dichloro-4-(2-nitro-1-butenyl) phenoxy]-propionic acid is obtained, M.P. 138–139° C., upon recrystallization from a mixture of one part benzene and one part hexane.

Analysis for $C_{13}H_{13}Cl_2NO_5$: Calculated, C, 46.72; H, 3.92; N, 4.19; Found: C, 46.75; H, 4.04; N, 4.30.

Example 9.—[2,4-dichloro-6-(2-nitro-1-butenyl) phenoxy]acetic acid

Step A: Ethyl (2,4-dichloro-6-formylphenoxy)acetate

A mixture of 2,4-dichloro-6-formylphenol (25.0 g., 0.131 mole), potassium carbonate (26.4 g., 0.19 mole) and ethylbromoacetate (32.0 g., 0.19 mole) in dimethylformamide is heated at 50–55° C. for one hour and then diluted with water (300 ml.). The solid that separates is crystallized from a mixture of four parts alcohol and three parts water to obtain 31 g. of ethyl (2,4-dichloro-6-formylphenoxy)-acetate, M.P. 52–53° C.

Analysis for $C_{11}H_{10}Cl_2O_4$: Calculated, C, 47.69; H, 3.64; Cl, 25.60. Found: C, 47.65; H, 3.97; Cl, 25.46.

Step B: [2,4-dichloro-6-(2-nitro-1-butenyl)phenoxy]- acetic acid

Ethyl (2,4 - dichloro - 6-formylphenoxy)acetate (4.88 g.), n-butylamine (1 g.) and benzene (50 ml.) is refluxed in a water separator until water ceases to be evolved. The benzene is evaporated and acetic acid (10 ml.) and 1-nitropropane (4.5 g.) are added. The mixture is refluxed for 10 minutes. The solvents then are evaporated at reduced pressure and acetic acid (20 ml.), water (14 ml.) and concentrated hydrochloric acid (1 ml.) are added. The mixture is refluxed for 48 hours and poured into water. An oil separates and slowly solidifies. The solid is extracted with ten 50 ml. portions of hot cyclohexane and the combined extracts are concentrated to 100 ml. and allowed to cool. The solid that separates melts at 125.5–130° C. Upon further extraction with cyclohexane the melting point of the [2,4-dichloro-6-(2-nitro-1-butenyl) phenoxy]acetic acid product is raised to 136–137° C.

Analysis for $C_{12}H_{12}Cl_2NO_5$: Calculated, C, 45.02; H, 3.46; N, 4.38. Found: C, 45.12; H, 3.60; N, 4.41.

Example 10.—4-[2,3-dichloro-4-(2-nitro-1-butenyl) phenoxy]butyric acid

Step A: 4-(2,3-dichloro-4-formylphenoxy)butyric acid

A mixture of 2,3-dichloro-4-formylphenol (5.73 g., 0.03 mole), ethyl 4-bromobutyrate (11.7 g., 0.06 mole) and potassium carbonate (8.28 g., 0.06 mole) in dimethylformamide (25 ml.) is heated at 50–60° C. for 1½ hours. Water (50 ml.) is added and the mixture is extracted with ether. The ether extract is dried and evaporated. To the residue is added a solution composed of 48 ml. of 40% sodium bisulfite and 12 ml. of alcohol. The precipitated bisulfite addition compound then is washed with alcohol and ether. An oily layer of the water and heated in a steam bath. An oily layer of the free aldehyde is formed. The hot water then is decanted and the oily layer is extracted with ether and the ether evaporated. The residue is heated to 80° C. in a mixture of potassium hydroxide (2.8 g.), methanol (30 ml.) and water (5 ml.), the resulting solution is evaporated to dryness and the residue dissolved in water. Upon acidification a solid separates. The solid is crystallized from benzene to obtain 2.9 g. of 4-(2,3-dichloro-4-formylphenoxy)butyric acid, M.P. 147–148° C.

Analysis for $C_{11}H_{11}Cl_2O_4$: Calculated, C, 47.67; H, 3.64; Cl, 25.59. Found: C, 47.70; H, 3.60; Cl, 25.65.

Step B: 4-[2,3-dichloro-4-(2-nitro-1-butenyl)phenoxy]- butyric acid

The 4-(2,3-dichloro-4-formylphenoxy)butyric acid (2.7 g., 0.01 mole) and n-butylamine (2.2 g., 0.03 mole), in benzene, are refluxed for three hours or until no more water is evolved. The benzene is evaporated and then acetic acid (12 ml.) and 1-nitropropane (3.6 g., 0.04 mole) are added. The mixture is heated to boiling and then poured onto ice. The yellow solid that separates is crystallized from ethanol to obtain 1.3 g. of 4-[2,3-dichloro-4-(2-nitro-1-butenyl)phenoxy]butyric acid, M.P. 155–156.5° C.

Analysis for $C_{14}H_{15}Cl_2NO_5$: Calculated, C, 48.29; H, 4.50; N, 4.02. Found: C, 48.51; H, 4.42; N, 4.30.

Example 11.—3-[2,3-dichloro-4-(2-nitro - 1 - propenyl) phenoxy]propionic acid

Step A: 3-(2,3-dichloro-4-formylphenoxy)propionic acid 2,3-dichloro-4-hydroxybenzaldehyde (38.2 g., 0.2 mole) is dissolved in a 10% sodium hydroxide solution (200 ml.). The solution is heated to boiling and β-propiolactone (144 g., 2.0 moles) is added dropwise at such as rate as to keep the solution boiling. During the addition 10% sodium hydroxide solution is added in portions to maintain an alkaline mixture. Then the solution is cooled and acidified. The precipitated material is dissolved in ether and the product is extracted into a 5% sodium bicarbonate solution. Acidification of the aqueous solution precipitates 3-(2,3-dichloro-4-formylphenoxy)propionic acid, which is purified by recrystallization from ethyl acetate.

Step B: 3-[2,3-dichloro-4-(2-nitro-1-propenyl)phenoxy] propionic acid

By following substantially the procedure described in Example 10, Step B, but substituting 1-nitrobutane for the 1-nitropropane recited therein, the compound 3-[2,3- dichloro-4-(2-nitro-1-propenyl)phenoxy]propionic acid is obtained.

Example 12.—[2,3-dimethyl-4-(2-nitro-1-butenyl)phenoxy]acetic acid

A mixture of 2,3-dimethyl-4-hydroxybenzaldehyde (1 g., 0.0081 mole), ethyl bromoacetate (2.7 g., 0.0162 mole) and potassium carbonate (2.26 g., 0.0162 mole) in dimethylformamide is heated at 55° C. for 10 hours and then poured into water. The oil that separates is extracted with ether. The ether extract is washed with water, dried and evaporated. The residue, ethyl (2,3-dimethyl-4-formylphenoxy)acetate, (2.0 g.) is refluxed with n-butylamine (1.5 g., 0.0076 mole) and benzene (20 ml.) until water ceases to be evolved (1½ hour). The benzene is evaporated and acetic acid (10 ml.) and 1-nitropropane (2.0 g.) is added. The mixture then is heated to boiling and poured into water. The oily precipitate which results is isolated by means of ether and hydrolyzed by heating with a mixture of acetic acid, water and hydrochloric acid. Upon adding the hydrolysis mixture to water, a solid separates. The solid is crystallized from a mixture of one part acetic acid and five parts water to obtain [2,3-dimethyl-4-(2-nitro-1-butenyl)phenoxy]acetic acid, M.P. 138.5–139.5° C.

Analysis for $C_{14}H_{14}NO_5$: Calculated, C, 60.20; H, 6.14. Found, C, 60.67; H, 6.30.

Example 13.—[2,4-dichloro-6-(2-nitrovinyl)phenoxy]acetic acid

Step A: (2,4-dichloro-6-formyloxy)acetic acid

Ethyl (2,4-dichloro-6-formylphenoxy)acetate (19.0 g.) is dissolved in methanol (100 ml.) containing potassium hydroxide (4.5 g.). The mixture is heated to boiling, and then added to a mixture of acetic acid, water and hydrochloric acid and then crystallized from n-butylchloride to obtain 12.4 g. of (2,4-dichloro-6-formylphenoxy)acetic acid, M.P. 163–165° C.

Analysis for $C_9H_6Cl_2O_4$: Calculated, C, 43.40; H, 2.43; Found, C, 43.80; H, 2.23.

Step B: [2,4-dichloro-6-(2-nitrovinyl)phenoxy]acetic acid (2,4-dichloro-6-formylphenoxy)acetic acid (10 g., 0.04 mole) and n-butylamine (8.8 g., 0.012 mole) in benzene (75 ml.) are refluxed until no more water is evolved (three hours). Acetic acid (30 ml.) is added and the benzene is evaporated at reduced pressure. To the remaining acetic acid solution is added nitromethane (7.3 g., 0.12 mole). The mixture is heated to boiling and poured into water. The solid that separates is crystallized from a mixture of seven parts ethanol, five parts of water and from benzene to obtain [2,4-dichloro-6-(2-nitrovinyl)phenoxy]acetic acid, M.P. 152–153.5° C.

Analysis for $C_{10}H_2Cl_2NO_5$: Calculated, C, 41.12; H, 2.42; N, 4.80; Found, C, 41.10; H, 2.63; N, 4.79.

Example 14.—[2,4-dichloro-6-(2-nitro-1-propenyl)phenoxy]acetic acid

By following the procedure described in Example 13 but substituting nitroethane for the nitromethane recited therein, there is obtained, after crystallization from a mixture of ligroinbenzene, methyl cyclohexane and n-butyl chloride, [2,4-dichloro-6-(2nitro-1 - propenyl)phenoxy]acetic acid, M.P. 113.5–114° C.

Analysis for $C_{11}H_9Cl_2NO_5$: Calculated, C, 43.16; H, 2.96; N, 4.58; Found, C, 43.37; H, 3.10; N, 4.57.

Example 15.—[2,3-dichloro-4-(2-nitro-1 - heptenyl)phenoxy]acetic acid

Step A: (2,3-dichloro-4-formylphenoxy)acetic acid

Ethyl (2,3-dichloro-4-formylphenoxy)acetate (19.0 g.) is dissolved in methanol (100 ml.) containing potassium hydroxide (4.5 g.). The mixture is heated to boiling, poured into water and the solution acidified. The solid that separates is crystallized from acetonitrile to obtain 12.4 g. of (2,3-dichloro-4-formylphenoxy)acetic acid, M.P. 207–210° C.

Step B: [2,3-dichloro-4-(2-nitro-1-heptenyl)phenoxy]acetic acid

By substituting equimolar amounts of (2,3-dichloro-4-formylphenoxy)acetic acid and 1-nitrohexane for the (2,4-dichloro-6-formylphenoxy)acetic acid and nitromethane of Example 13 and following substantially the procedure described therein, there is obtained [2,3-dichloro-4-(2-nitro-1-heptenyl)phenoxy]acetic acid, M.P. 132–133° C. from methylcyclohexane.

Analysis for $C_{15}H_{17}Cl_2NO_2$: Calculated, C, 49.74; H, 4.73; N, 3.87; Found, C, 49.84; H, 4.73; N, 3.90.

Example 16.—[2,3-dichloro-4-(2-nitro-1-hexenyl)phenoxy]acetic acid

By substituting equimolar amounts of (2,3-dichloro-4-formylphenoxy)acetic acid and 1-nitropentane for the (2,4-dichloro-6-formylphenoxy)acetic acid and nitromethane of Example 13 and following substantially the procedure described therein, there is obtained [2,3-dichloro-4-(2-nitro-1-hexenyl)phenoxy]acetic acid, M.P. 138–139° C. from methylcyclohexane.

Analysis for $C_{14}H_{15}Cl_2NO_5$: Calculated, C, 48.24; H, 4.34; N, 4.02; Found, C, 48.51; H, 4.29; N, 4.30.

Example 17.—Methyl [2,3-dichloro-4-(2-nitro-1-propenyl)phenoxy]acetate

[2,3-dichloro-4-(2-nitro-1-propenyl)phenoxy]acetic acid (1 g.) is dissolved in a mixture of methanol (19 ml.) and sulfuric acid (10 drops). The mixture is stirred at 20–25° C. for one hour whereupon a solid separates. The solid is crystalized from methanol to obtain 600 mg. of methyl [2,3-dichloro-4-(2-nitro - 1 - propenyl)phenoxy]acetate, M.P. 118–119° C.

Analysis for $C_{12}H_{12}Cl_2NO_5$: Calculated, C, 45.02; H, 3.46; N, 4.28; Found, C, 45.17; H, 3.36; N, 4.17.

Example 18.—[2,3-dichloro-4-(2-nitro-1-propenyl)phenoxy]acetamide

[2,3 - dichloro - 4 - (2 - nitro - 1 - propenyl)phenoxy]acetic acid (4.0 g., 0.01306 mole) is dissolved in benzene (50 ml.) and thionyl chloride (4.0 g., 0.0333 mole) is added. The mixture then is refluxed for two hours and benzene and excess thionyl chloride are evaporated at reduced pressure. Additional benzene is again added and the mixture evaporated to dryness to obtain an oil. An excess of concentrated ammonium hydroxide (10 ml.) is added to the oil whereupon solidification occurs. The solid then is collected and recrystallized from a mixture of benzene and hexane to obtain 1.54 g. of [2,3-dichloro-4-(2-nitro-1-propenyl)phenoxy]acetamide, M.P. 155–158° C. Further recrystallization of the product from a mixture of benzene (50 ml.) and acetonitrile (1 ml.) gives 580 mg. of [2,3-dichloro-4-(2-nitro-1-propenyl)phenoxy]acetamide, M.P. 161.5–162° C. in 13.8% yield.

Analysis for $C_{11}H_{10}Cl_2N_2O_4$: Calculated, C, 43.30; H, 3.31; Cl, 23.24. Found, C, 43.43; H, 3.23; Cl, 23.12.

In a manner similar to that described in Example 1, Steps B, C and D, supra, for the preparation of [2,3-dichloro-4-(2-nitro-1-propenyl)phenoxy]acetic acid, all of the [(2-nitro-1-alkenyl)aryloxy]alkanoic acid products (I) of the invention may be obtained. Thus, by substituting the appropriate nuclear hydroxy substituted benzaldehyde, alkyl haloalkanoate and nitroalkane or aryl substituted nitroalkane, respectively, for the 2,3-dichloro-4-hydroxybenzaldehyde, ethyl bromoacetate and nitroethane reactants recited in Example 1, and following substantially the procedure described in Steps B, C and D of that example, all of the [(2-nitro-1-alkenyl)aryloxy]alkanoic acid products (I) of the invention may be obtained. The following equations illustrate the reaction of Example 1, Steps B, C and D and, together with Table I, depict the nuclear hydroxybenzaldehyde, alkyl haloalkanoate, nitroalkane or aryl substituted nitroalkane starting materials of the process and the corresponding products produced thereby:

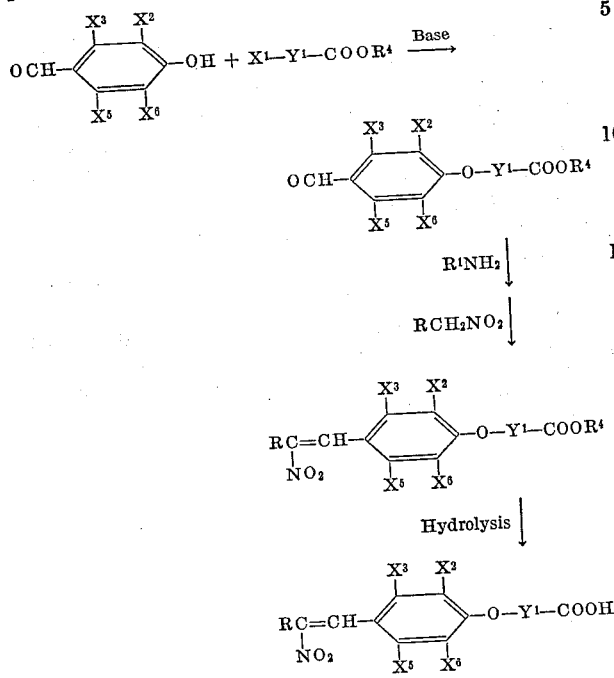

The products of the invention are diuretic and saluretic agents which can be administered in a wide variety of therapeutic dosages in conventional vehicles as, for example, by oral administration in the form of a tablet as well as by intravenous injection. Also, the dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated.

A suitable unit dosage form of the products of this invention can be administered by mixing 20 mg. of a [(2-nitro-1-alkenyl)aryloxy]alkanoic acid (I) or a suitable acid addition salt, ester or amide derivative thereof, with 174 mg. of lactose and 6 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

Example 30.—Dry-filled capsules containing 20 mg. of active ingredient per capsule

| | Per capsule (mg.) |
|---|---|
| [2,3-dichloro-4-(2-nitro-1-propenyl)-phenoxy]acetic acid | 20 |
| Lactose | 174 |
| Magnesium stearate | 6 |
| Capsule size No. 1 | 200 |

The [2,3-dichloro-4-(2-nitro-1-propenyl)phenoxy] acetic acid is reduced to a No. 60 powder and then lactose and magnesium stearate are passed through a No. 60 bolting cloth onto the powder and the combined ingredients admixed for 10 minutes and then filled into No. 1 dry gelatin capsules.

Similar dry-filled capsules can be prepared by replacing the active ingredient of the above example by any of the other novel compounds of this invention.

It will be apparent from the foregoing description that the [(2-nitro-1-alkenyl)aryloxy]alkanoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A member selected from the group consisting of a compound having the formula:

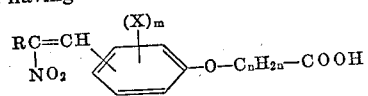

wherein R is a member selected from the group consisting of hydrogen and lower alkyl; the X radicals are similar or dissimilar members selected from the group consisting of halogen, lower alkyl and, taken together, two X radicals on adjacent carbon atoms of the benzene ring may be joined to form an hydrocarbylene chain containing from three to four carbon atoms between their points of attachment; $m$ is an integer having a value of one to two to four and $n$ is an integer having a value of one to three; and the nontoxic, pharmacologically acceptable

TABLE I

| Ex. | R | R¹ | R⁴ | X² | X³ | X⁵ | X⁶ | Y¹ |
|---|---|---|---|---|---|---|---|---|
| 19 | —CH₂ | —(CH₂)₃CH₃ | —C₂H₅ | Cl | Cl | H | H | —(CH₂)₃— |
| 20 | —C₂H₅ | (phenyl) | —C₂H₅ | —CH₂ | H | H | —CH₃ | —CH₂— |
| 21 | H | —(CH₂)₄CH₃ | —CH₃ | —CH₃ | —CH₂ | —CH₃ | —CH₃ | —CH₃ | —CH₂— |
| 22 | —(CH₂)₄CH₃ | —(CH₂)₃CH₃ | —CH₃ | H | —CH₃ | —CH₃ | H | —(CH₂)₃— |
| 23 | —C₂H₅ | (phenyl)—CH₃ | —C₂H₅ | —(CH₂)₄— | | H | H | —(CH₂)₃— |
| 24 | —CH₃ | —(CH₂)₂CH₃ | —C₄H₉ | —CH₂ | —CH₃ | H | H | —CH₂— |
| 25 | —(CH₂)₂CH₃ | (phenyl) | —C₂H₅ | Cl | Cl | H | H | —CHCH₃—<br>—CHCH₃— |
| 26 | —C₂H₅ | —(CH₂)₃CH₃ | —CH₃ | —CH₃ | H | H | —CH₃ | —CH₂— |
| 27 | —CH₃ | —(CH₂)₂CH₃ | —CH₃ | —CH=CH-CH=CH— | | H | H | |
| 28 | —CH₃ | —(CH₂)₃CH₃ | —C₂H₅ | —(CH₂)₄— | | H | H | |
| 29 | —CH₃ | (phenyl) | —C₃H₇ | —CH₃ | —CH₃ | H | —CH₃ | —(CH₂)₃— | salts, lower alkyl esters and amide derivatives thereof.

2. A compound having the formula:

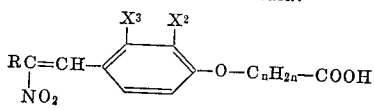

wherein R is lower alkyl; $X^2$ and $X^3$ each represent a member selected from the group consisting of halogen, lower alkyl and 1,3-butadienylene and $n$ is an integer having a value of one to three.

3. A compound having the formula:

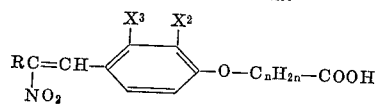

wherein R is lower alkyl; $X^2$ and $X^3$ are halogen and $n$ is an integer having a value of one to three.

4. A compound having the formula:

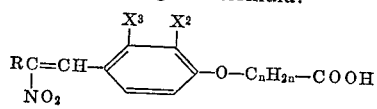

wherein R is lower alkyl; $X^2$ and $X^3$ are lower alkyl and $n$ is an integer having a value of one to three.

5. A compound having the formula:

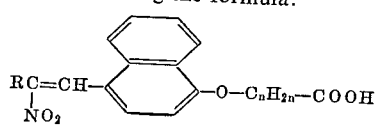

wherein R is lower alkyl and $n$ is an integer having a value of one to three.

6. [2,3 - dichloro - 4 - (2-nitro-1-propenyl)phenoxy] acetic acid.

7. [2,3 - dichloro-4-(2-nitro-1-butenyl)phenoxy]acetic acid.

8. [4-(2-nitro-1-butenyl)-1-naphthyloxy]acetic acid.

9. [4-(2-nitro-1-propenyl)-1-naphthyloxy]acetic acid.

10. 2-[2,3-dichloro - 4 - (2-nitro-1-propenyl)phenoxy)-propionic acid.

11. 2 - [2,3-dichloro-4-(2-nitro - 1 - butenyl)phenoxy] propionic acid.

12. [2,3-dimethyl - 4 - (2 - nitro-1-butenyl)phenoxy] acetic acid.

13. [2,3 - dichloro - 4 - (2-nitro-1-heptenyl)phenoxy] acetic acid.

14. [2,3-dichloro-4-(2 - nitro - 1 - hexenyl)phenoxy] acetic acid.

15. Ethyl [2,3-dichloro-4-(2-nitro - 1 -propenyl)phenoxy]-acetate.

16. [4 - (2- - nitro - 1 - butenyl)-5,6,7,8-tetrahydro-1-naphthyloxy]acetic acid.

References Cited

J. American Chemical Society, vol. 56 (1934), by Worrall, pp. 1556 to 1558 relied on.

Advanced Organic Chemistry, by Royals (1961), pp. 600 to 601 relied on.

LORRAINE A. WEINBERGER, *Primary Examiner.*

L. THAXTON *Assistant Examiner.*